No. 894,878. PATENTED AUG. 4, 1908.
H. H. CUTLER.
VARIABLE SPEED TRANSMISSION.
APPLICATION FILED JAN. 5, 1906.

Witnesses
C. M. Rolf.
Gertrude H. Bank

Henry H. Cutler, Inventor
By George Wetmore Colles
Attorney

Fig. 2

No. 894,878. PATENTED AUG. 4, 1908.
H. H. CUTLER.
VARIABLE SPEED TRANSMISSION.
APPLICATION FILED JAN. 5, 1906.

Witnesses
Henry H. Cutler, Inventor
By George Wetmore Colles
Attorney

UNITED STATES PATENT OFFICE.

HENRY H. CUTLER, OF MILWAUKEE, WISCONSIN, ASSIGNOR TO THE CUTLER-HAMMER MNFG. COMPANY, A CORPORATION OF WISCONSIN.

VARIABLE-SPEED TRANSMISSION.

No. 894,878.   Specification of Letters Patent.   Patented Aug. 4, 1908.

Application filed January 5, 1906. Serial No. 294,679.

*To all whom it may concern:*

Be it known that I, HENRY H. CUTLER, of Milwaukee, Wisconsin, have invented a Variable-Speed Transmission, of which the following is a specification.

This invention relates to devices for varying, regulating and controlling the speed of machinery driven by a thermic-engine, electric motor, or a prime-mover of any kind, the said prime-mover having either a fixed or a variable speed. In its fullest development, however, my invention relates to the variable-speed control of a shaft driven through the agency of an electric motor, and while useful for a great variety of purposes and situations, has particular application to motor-driven vehicles.

The objects and aims of my invention are manifold, but in a general way I aim to improve the means of control of electrically propelled vehicles by rendering it more easy for an unskilled operator to regulate the speed thereof; and more difficult, and, under certain circumstances, actually impossible for the operator to overdischarge or too rapidly discharge the batteries which provide the source of power. Besides these and other ends, my invention provides means for operating a driven-shaft, as for instance the wheel-shaft of an automobile, at a substantially constant speed corresponding to a given position of a controlling-device and practically independent of the load upon the shaft; or, as in the case of automobiles, the condition or grade of the road.

One of the distinctive features of my invention consists of a compound or double-speed clutch mechanism, operating in conjunction with the rest of the apparatus to change the speed ratio between the driving and driven shafts, the said clutch operating electromagnetically, on the principle of the electromagnetic clutches or speed accelerators already devised and patented by me. (See for example, my Patent No. 786,411, issued April 4, 1905.) This clutch, in addition to providing for two different speeds, is so arranged as to permit of locking the driven shaft against motion altogether.

Another feature of my invention consists in the arrangement of the controlling mechanism and devices for automatically changing the field-strength of the motor and shifting the aforesaid clutch from one speed to the other, by simply turning a handle into different successive positions, each of which corresponds to a certain definite speed without reference to the load.

Another feature of my invention consists in an overload signal arranged to ring a bell or otherwise notify the operator whenever the current used becomes excessive, so that the same may be shut off or diminished, thereby preventing injurious overdischarge of the batteries.

Another feature of my invention consists in means whereby, should the operator disregard the signal so conveyed, the mechanism is automatically operated to shift the speed from the high to the low speed side of the aforesaid clutch, thus reducing the current to a normal value, so that it becomes impossible for any overdischarge of the batteries to take place.

Another feature of my invention consists in providing means operated by said controller whereby the speed is not simply automatically accelerated, but likewise automatically slackened and electrically braked, the power consumed by said braking being absorbed by the motor and restored to the batteries and thus utilized.

Another feature of my invention consists in the means whereby the aforesaid compound clutch may be so operated as to stop both motor and driven-shaft and prevent them from running altogether, thus dispensing entirely with mechanical brakes.

These and other features of my invention will best be understood from a consideration of the following description, reference being had to the accompanying drawings, wherein.

In these drawings every reference character refers always to the same part.

Figure 1:
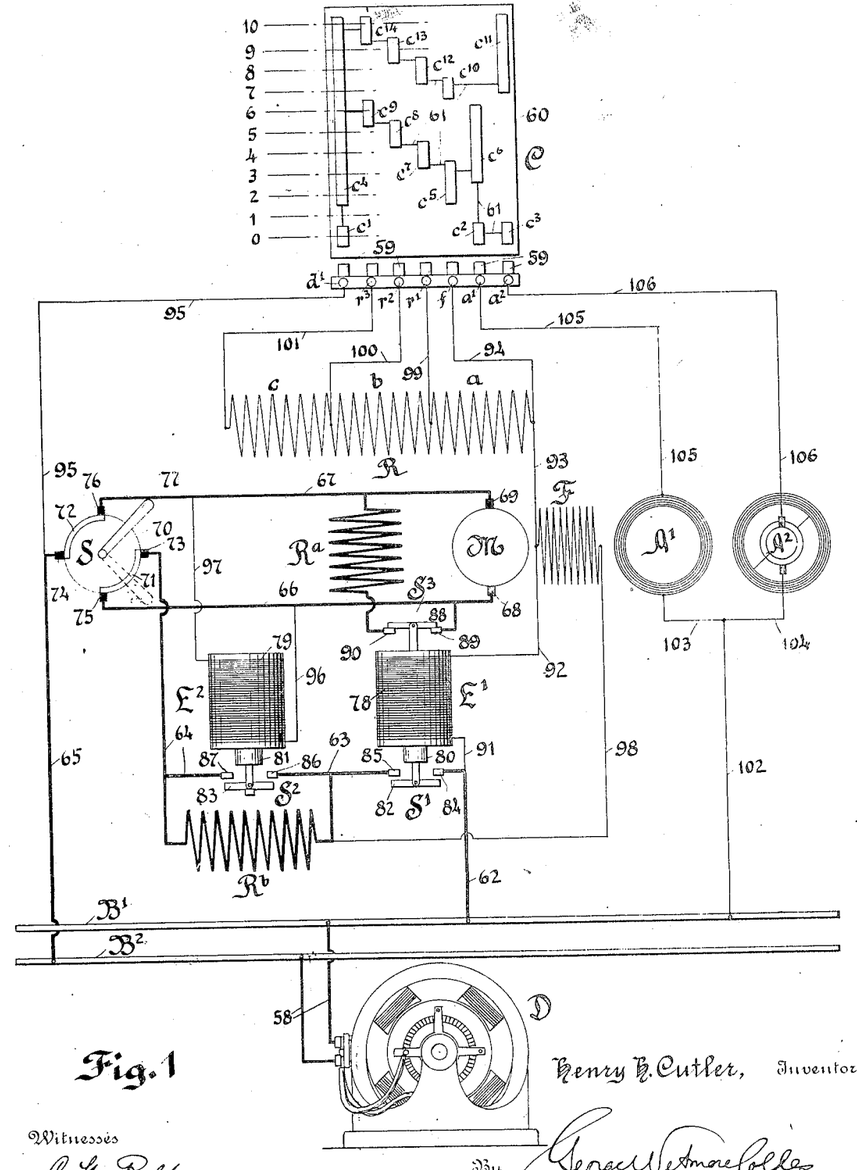
Figure 1 is a diagrammatic scheme of the electrical connections embodied in the general construction of my invention.
Figure 2:
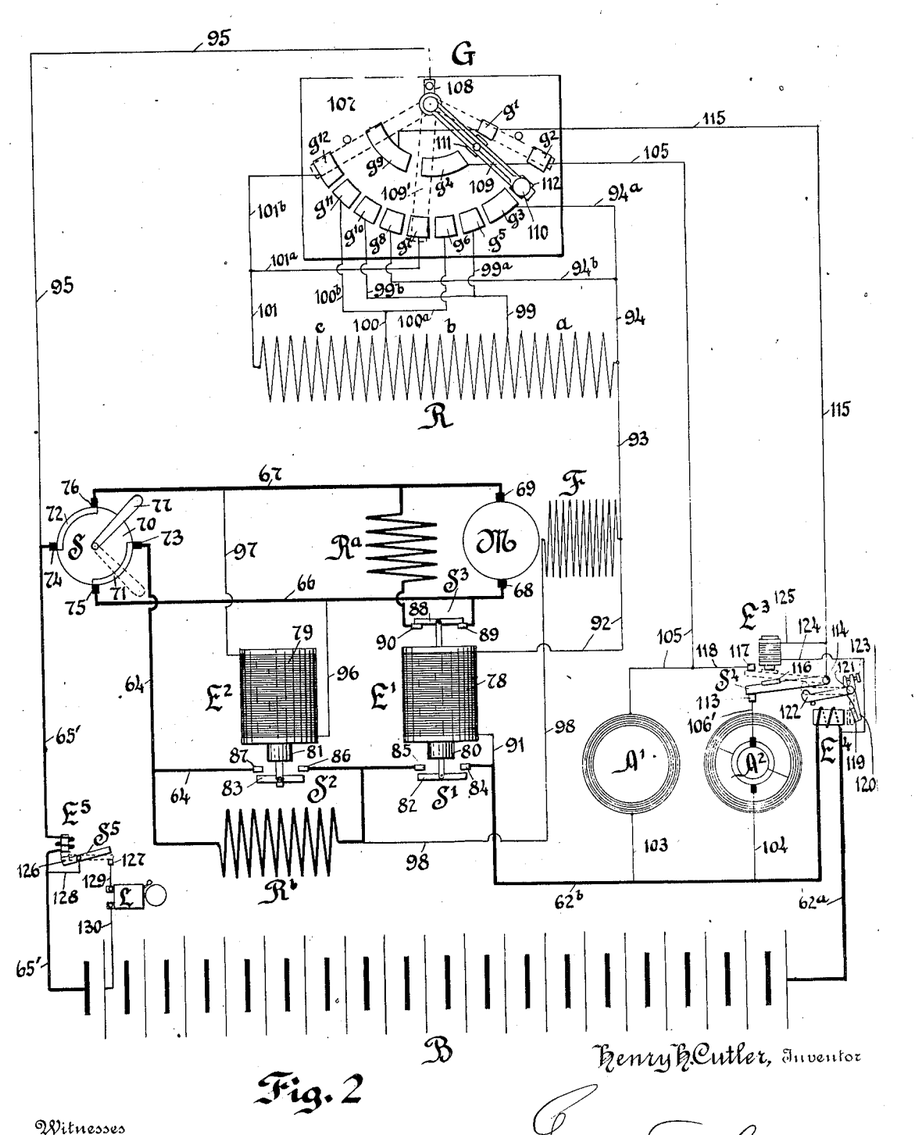
Fig. 2 is a diagrammatic scheme of the construction as more particularly adapted to motor-driven vehicles.
Figure 3:
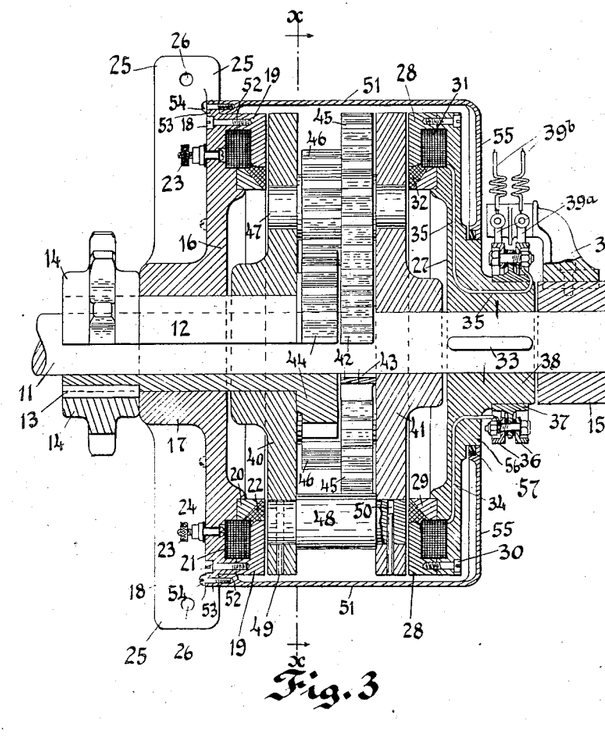
Fig. 3 is an axial section through the compound clutch, which forms a part of the involved mechanism.
Figure 4:
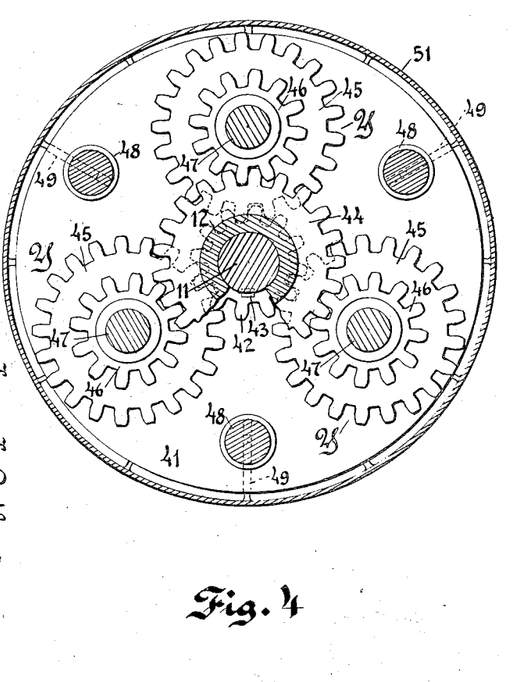
Fig. 4 is a transverse section therethrough on the line $x$ of Fig. 3.

In order to understand the scheme of connections and their effect as set forth in Figs. 1 and 2, it will first be proper to explain the mechanism of the compound clutch as shown in Figs. 3 and 4. Referring to these figures, 11 represents a driving-shaft, which is mechanically connected with an electric motor, steam or gas-engine, or any other form of prime mover; this shaft constitutes the driving-element of the transmission-mechanism. On the shaft is mounted and turns loosely a sleeve 12, to one end of which is keyed by means of a key 13 a sprocket-wheel or pinion 14; this forms the driven element. The sprocket-wheel or pinion 14 will be connected in use with a countershaft or any object to be driven, and may of course be replaced by a gear-wheel, pulley or other equivalent transmitting device.

At the right-hand end of the shaft 11 is a bearing block 15 to support said shaft. On the left-hand side there is a clutch-disk 16, which has a hub 17 forming a bearing-support for the sleeve 12 and the shaft 11 within it. This clutch-disk has secured to its inner face by means of screws 18, an outer and inner field-ring 19 and 20, which inclose a magnetizing coil 21 insulated therefrom, and are separated from each other or magnetically insulated by a filling of Babbitt or non-magnetic alloy 22, the whole being constructed substantially as shown in my aforesaid Patent No. 786,411. The coil 21 is shown as provided with terminal binding-posts 23, which are of course insulated from the disk 16 by insulating layers 24.

The disk 16 and the parts attached to it are herein supposed to be fixed, and are shown as provided with attachment-lugs 25, each provided with a bolt-hole 26, by means of which it may be secured to a fixed object. On the opposite side of the clutch there is another disk 27, which is similarly constructed, being provided with outer and inner field-rings 28 and 29 secured to the disk by screws 30, a magnetizing-coil 31 and a layer of alloy 32; this member of the clutch is, however, not fixed but rotates with the shaft 11, being keyed thereto by a key 33. On account of its rotation the coil 31 is not provided with fixed terminals, but the ends of the coil are carried down through channels 34, 35, cored in the disk, and out to a pair of slip-rings 36, which are mounted upon an annular support 37, which in turn is mounted upon the hub 38 of the disk. A bracket 39 is mounted upon the bearing-block 15 and forms a support for brushes 39$^a$, to which the terminal-wires 39$^b$ of the clutch are connected, thus forming means for energizing the coil 31, while the clutch-disk rotates. (The brush-holder and brushes are necessarily shown in side-elevation, although the disk 16 is supposed to be in plan to illustrate the lugs 25.)

Between the fixed clutch-disk 16 and the rotating clutch-disk 27, there is mounted a double armature consisting of two iron disks 40, 41, the former of which turns freely upon the sleeve 12, and the latter upon the shaft 11. These disks form not only armatures for the clutch-disks, but bearing-supports for an epicyclic train, which consists of five members, namely: a driving-pinion 42 keyed upon the shaft 11 by a key 43; a driven gear-wheel 44 formed on the end of the sleeve 12; and three connecting members Y, each comprising a spur-gear 45 meshing with the pinion 42, a pinion 46 meshing with the gear 44, and a pair of gudgeons 47 turning in suitable bearing-holes in the armature disks 40, 41. The two disks are further secured rigidly together by shouldered connecting-pins 48, the reduced ends of each pin passing into holes in the armature-plates and being secured therein by pins 49 driven into holes in the edge of the disk and into diametrical holes 50 in said reduced ends.

It will of course be understood that, while I have shown three members Y, the same mechanical effect would be accomplished by one, two or four members, and that the object in using a plurality is simply to balance the sidewise thrust upon the bearings, and cause the gears to run more smoothly.

Surrounding and inclosing the mechanism of the clutch is a casing 51 having a cylindrical and a plane side, the former having an annular boss 52 abutting against a shoulder 53 on the margin of the clutch-disk 16, and secured thereto by screws 54. The plane side 55 of the casing has a circular opening through which passes the hub of the disks 27, which disk is provided with a shoulder 56 as shown, making a close joint with the inner margin of the casing, and the latter is provided with a packing-ring 57 set in a groove and preventing the access of dust to the interior. The casing forms an oil-tight inclosure, and the interior being filled with proper lubricants, the latter are continually thrown over the moving parts. At the same time it is to be noted that no oil, grease or dirt can come in contact with the electric wiring.

In order to enable the parts to operate properly, the sleeve 12 and the shaft 11 have a slight end-play so that the disk 40 can be drawn up tight against the stationary clutch-disk 16, and the armature-disk 41 can be drawn up tight against the rotating clutch-disk 27. The former I will term the slow speed and the latter the high speed disk. Suppose now that the shaft 11 is being driven by the source of power as aforesaid, and it is desired to drive the sleeve 12 and sprocket 14 at the slow speed, then by suitable controlling mechanism, which will be hereinafter described, the magnetizing coil 21 is energized, the armature-disk 40 drawn up into contact with the clutch-disk and is prevented by friction and magnetic force from rotating. The pinion 42 will then drive the members Y, and the latter will in turn drive the gear 44 upon the sleeve 12 at a speed depending on the gear-ratio, which is in the present case about 1 to 3, so that the sleeve 12 turns at one-third the rate of rotation of the shaft 11. Should it be desired to drive the sleeve 12 and the gear 14 at the high speed, then the magnetizing coil 21 is cut out and the magnetizing coil 31 is energized through the wires $39^b$, and this operates to draw the armature-disk 41 against the clutch-disk 27 and causes it to rotate at the same speed as the shaft 11. Inasmuch as the pinion 42 is now stationary relative to the disk 41, the members Y will not rotate in their bearings, but will likewise remain stationary relative to the members 40, 41, which are being driven at the speed of the shaft 11, and the gear-wheel 44 will therefore also be driven at the same speed, so that the high speed of the sleeve 12 is three times the low speed, or any other multiple of it, depending on the gear-ratio of the epicyclic train. Furthermore, it is to be observed that in case both magnetizing coils are energized, motion of both the shaft 11 and sleeve 12 will now be absolutely prevented, supposing the strength of magnetization be sufficient to overcome the friction of the armature-disks; for the driving of the sleeve 12 at a speed bearing two different ratios to the speed of the shaft 11 is possible only when that speed is zero. Otherwise stated, the armature-disks 40, 41 are held stationary by the stationary clutch-disk 16, and in turn act upon the clutch-disk 27 to hold it and the shaft 11 stationary. Of course, should the motor be running when this connection is made, the stopping will not be instantaneous, but the clutches will act as a powerful brake to stop the motor in a minimum of time. Resistances could also be thrown in series with the magnetizing coils 21, 31, which would diminish their strength, and would cause the braking action to be less violent.

Referring now to Fig. 1 of the drawings, I will describe the plan of connections according to my invention of controlling an electrically driven shaft. In this figure, D represents a dynamo or any suitable source of current which delivers the same through current-leads 58 to a pair of bus-bars $B^1$, $B^2$, from which is taken the current-supply for driving the electric motor M and for energizing the slow and fast clutch-elements $A^1$ and $A^2$, corresponding to those of the compound clutch already described. The controlling-mechanism consists of a controller C, a reversing-switch S, two electromagnetic elements $E^1$, $E^2$, and resistances R, $Ra$ and $Rb$. The motor M is a shunt-wound motor having a shunt-field F.

The controller C may be made in a variety of forms, none of which are essential to my invention, although the mode of connection forms an essential part thereof. In Fig. 1 it is for simplicity represented as of the rotary drum type, wherein the different leads to be controlled are connected with fixed terminals, designated from left to right $d^1$, $r^3$, $r^2$, $r^1$, $f$, $a^1$, $a^2$, each provided with a contact-finger 59, which contact-fingers are mounted in proximity to a drum 60 having mounted thereon contact-strips designated $c^1$ to $c^{14}$, respectively, which are all connected electrically together as by wires 61, the surface of the drum being covered with insulating material. The drum 60 is, according to the usual arrangement, provided with a handle to rotate it, but is herein shown as developed on a plane for the purpose of illustrating the connections. There are supposed to be 11 positions of the drum with respect to the fingers 59, which are represented by the lines numbered 0 to 10, inclusive, on which lines the contact-fingers 59 make electrical contact with the contact-strips $c^1$ to $c^{14}$.

The current-leads for the motor, which are indicated by the heavy lines, comprise a connection of several conductors 62, 63 and 64, which lead from the bus-bar $B^1$, to one terminal 73 of the reversing-switch S; a lead 65 which connects the bus-bar $B^2$ with the opposite terminal 74 thereof; and a pair of leads 66, 67, which connect the other two terminals 75, 76 of the reversing-switch with the brushes 68, 69 of the armature of the motor M. The reversing-switch S may be of any type whatever, being here shown for convenience as comprising a disk 70 carrying quadrantal contact-strips 71, 72, against which press the brushes or contact-blocks 73, 74, 75, 76, the disk 70 being provided with a handle 77 by which it may be turned through 90°, thereby connecting the brushes 73 and 75 together on the one side, and the brushes 74 and 76 on the other. This switch is only provided in those cases where it is desired to reverse the motor; where the motor is always to be driven in the same direction, it may be omitted, and leads 64, 65 connected directly with the armature-leads 66 and 67.

The connection 62, 63, 64 from the bus-bar $B^1$ (which will be here considered for the sake of convenience the positive bus-bar, although of course this term is merely relative) is broken by the insertion therein of switches $S^1$, $S^2$, which are connected to and operated by the electromagnetic elements $E^1$, $E^2$ respectively. These latter are represented symbolically as solenoid magnets 78, 79 having cores or armatures 80, 81, to which are connected the connecting pieces 82, 83 of the switches $S^1$, $S^2$. The terminals 84, 85 of the switch $S^1$ and the terminals 86, 87 of the switch $S^2$ are so disposed that these switches will be closed when the solenoids 78, 79 are energized by currents passing through them. The element $E^1$ is further provided with another switch $S^3$, the movable element 88 whereof is connected to the core 80 and connects the terminals 89, 90, which are connected respectively with the leads 66, 67 through the resistance $Ra$, which may, if thought desirable, be arranged in the field of the motor to energize it when current passes through the resistance $Ra$—, as well understood in the art, but this is not necessary, as the residual field magnetism is amply sufficient to provide the required braking effect. But I do not consider my invention confined to this precise arrangement of circuits for producing said braking effect, as there are numerous other ways, well-known to the art, of producing the same result. The terminals 89, 90 are so arranged with respect to the movable element 88 that the switch $S^3$ is closed when the element $E^1$ is out of circuit, and is opened as soon as $E^1$ is energized. Also, the terminals 86, 87 of the switch $S^2$ are permanently connected by the resistance $Rb$, so that this switch merely acts to short-circuit said resistance when closed by the electromagnetic-element $E^2$.

The solenoid 78 of the electromagnetic-element $E^1$ is connected on the positive side to the bus-bar $B^1$ by a lead 91, and on the negative side by leads 92, 93 and 94 to the terminal-post $f$ of the controller C, through which in the various positions of the controller-drum 60 it is connected at the proper times with the terminal-post $d^1$, which in turn is connected with the negative bus-bar $B^2$ by a lead 95. The solenoid 79 is connected by leads 96, 97 to the opposite poles of the motor-armature as shown.

The field F of the motor M is connected on the positive side by a lead 98 to the terminal 85 of the switch $S^1$, in such manner that it is necessary that this switch be closed before the field is connected in circuit. On the negative side it is connected by the leads 93 and 94 to the terminal-post $f$, and thence through the controller to the post $d^1$, and thence by the lead 95 to the bus-bar $B^2$. It has attached thereto, to regulate the strength thereof, the resistance R, which is divided into a plurality of sections $a$, $b$, $c$ by leads 99, 100, 101, which are respectively connected to the posts $r^1$, $r^2$, and $r^3$ of the controller.

The clutch-elements $A^1$, $A^2$ are both connected permanently on the positive side to the bar $B^1$ by leads 102, 103, 104, and on the negative side they are connected by leads 105, 106 to the posts $a^1$, $a^2$ respectively, and thence through the controller-drum to the post $d^1$, lead 95 and bar $B^2$.

The operation of the system in the several positions of the controller are as follows, starting with the controller in the position 1, which is the normal position at rest, in which none of the contact-fingers 59 are in contact with any of the contact-strips of the controller-drum: The drum being now turned to the position 2, the terminal-post $d^1$ will be connected to the strip $c^4$ and the post $f$ to the strip $c^5$. The current will now flow from the bar $B^1$ by the leads 62 and 91 through the solenoid 78 of the element $E^1$, and thence by leads 92, 93 and 94, post $f$, strips $c^5$ and $c^4$, post $d^1$ and leads 95 and 65 to the bar $B^2$. The solenoid will accordingly attract its core 80 and open the switch $S^3$; at the same time closing the switch $S^1$ so that current will now flow by the leads 62 and 63 through the resistance $Rb$, and thence by the lead 64, the contact-strip 71 of the reversing-switch S, and the lead 66, through the motor-armature M, and thence by the leads 67, strip 72 of the reversing-switch, and lead 65, to the negative bar $B^2$. Current will simultaneously flow through the motor-field F by way of the leads 98, 93 and 94; the terminal post $f$, contact-strips $c^5$ and $c^4$, terminal post $d^1$ and lead 95, thus energizing the motor and setting it in motion. During this time the clutches $A^1$ and $A^2$ are out of circuit, so that the motor is started without load. As soon as the motor rises to speed the potential difference between the brushes 68 and 69 thereof rises, and sufficient current flows through the solenoid 79 of the element $E^2$ by way of the leads 96, 97 to attract the core 81 and close the switch $S^2$, thus short-circuiting the resistance $Rb$ and increasing the current flowing through the motor-armature. The controller being now shifted to the position 3, the contact-strip $c^6$ makes connection with the finger 59 of the post $a^1$, thus throwing the low speed clutch-element $A^1$ into circuit, the other connections remaining as before. The driven-shaft accordingly starts in motion at the lower speed, and this speed may be raised to some extent by increasing the speed of the motor, which is done by throwing one or more sections of the resistance R into series with the field, corresponding to positions 4, 5, 6 of the controller-drum, in which, as will be seen, the terminal-post $f$ is disconnected and the posts $r^1$, $r^2$, $r^3$, successively connected with the contact-strips $c^7$, $c^8$, $c^9$. The operator may continue to run the shaft at any one of these speeds, or he may still further increase the speed by shifting the controller-drum to the position 7, when the terminal-post $a^1$ of the low speed clutch-element $A^1$ is disconnected from the strip $c^6$ and at the same time the post $f$ is connected with the strip $c^{10}$ and the post $a^2$ with the strip $c^{11}$, thus throwing out the resistance R and simultaneously energizing the high speed clutch-element $A^2$. The speed of the driven-shaft may be still further increased by turning the controller-drum to the positions 8, 9 and 10, which by means of the contact-strips $c^{12}$, $c^{13}$, $c^{14}$ again throw successive sections of the resistance R into series with the field F.

Inasmuch as the speed of a shunt-motor is very nearly constant to varying load, it will be seen that each position of the controller-drum corresponds to a fixed and definite speed without regard to what load may be on the motor. Hence speed-indicators may be dispensed with and the position of the controller depended on alone to attain a given speed. Furthermore, it will be observed that in returning the controller from position 10 back to position 2, the speed will be successively slackened by the energy of the motor M, and this energy which is absorbed from the driven-shaft will be returned to the bars $B^1$, $B^2$. When the controller-drum reaches the position 1 all the connections are thrown out, and the solenoid 78 will drop its core, opening the switch $S^1$ and disconnecting the motor, and at the same time closing the switch $S^3$ and the armature circuit through the resistance $Ra$, which being of low resistance, a large current, generated by the momentum of the driven parts, will flow through the motor-armature, thus acting as a powerful brake on the mechanism.

In addition to the positions 1 to 10 of the controller, I may provide an eleventh position, designated 0, which is on the opposite side of the position 1, for the purpose of stopping the mechanism absolutely and locking it against movement. In this position, while the motor and its connections are thrown out, the terminals $a^1$ and $a^2$ of both clutch-halves are connected by the strips $c^2$, $c^3$ and $c^1$ with the negative terminal-post $d^1$, the effect being to energize both clutch-elements, which brings the motor and driven-shaft to an absolute stop, as described in connection with Figs. 3 and 4.

In Fig. 2 is shown a further development of my system as more particularly adapted to motor-driven vehicles which are operated by a storage-battery, this latter being, as previously explained, subject to permanent injury through any excess of discharge current, and in this form I have accordingly shown safety-appliances for protecting the battery, which appliances for the sake of simplicity are omitted from Fig. 1. I have also shown in this figure a different style of controller, to illustrate the fact that any controller may be employed when the connections are properly arranged.

The source of electromotive power is here shown accordingly as a battery B. The controller is designated G. The motor M, its field F, reversing-switch S, switches $S^1$, $S^2$ and $S^3$, electromagnetic-elements $E^1$, $E^2$, resistances R, $Ra$ and $Rb$ and the clutch-elements $A^1$, $A^2$ are all as previously shown, and designated by the same characters. The controller G consists of an insulating base 107 on which is mounted a terminal-post 108, which forms a pivot for a contact-arm 109 having a handle 110, and is provided with two contact-blocks or pieces 111 and 112 making contact with a plurality of terminal-strips $g^1$ to $g^{12}$ inclusive, disposed in two arcuate series as shown. The current-leads comprise leads $62^a$, $62^b$ from the positive pole of the battery to the terminal 84 of the switch $S^1$; the lead 65' from the brush 74 of the reversing-switch to the negative pole of the battery; and the other connections and apparatus as described for Fig. 1. The lead 95 is here connected to the terminal-post 108 of the controller, and the negative terminal of the field F is connected by leads 93, 94, $94^a$ and $94^b$ with the contact-strips $g^3$ and $g^8$ thereof. The lead 99 from the first section of the resistance R has branches $99^a$ and $99^b$ connecting it with the strips $g^5$ and $g^{10}$ respectively, and in like manner the lead 100 from the second section $b$ has branch leads $100^a$ and $100^b$ connecting it with the strips $g^6$ and $g^{11}$, and the lead 101 from the third section $c$ has branch leads $101^a$ and $101^b$ connecting it with the strips $g^7$ and $g^{12}$. The low-speed clutch-element $A^1$ is connected on the positive side by a lead 103 and the lead $62^a$ to the positive pole of the battery B, and on the negative side through the lead 105 to the contact-strips $g^2$ and $g^4$ of the controller. The high-speed clutch-element $A^2$ is connected on the positive side by the leads 104 and $62^a$ to the positive pole of the battery, and on the negative side by a lead 106'', with one terminal 113 of a safety-switch $S^4$; and the other terminal, consisting of the pivot 114, is connected by a lead 115 with the terminals $g^1$ and $g^9$ of the controller G. The switch $S^4$ is electromagnetically acted on by means of a magnet $E^3$, which acts upon an armature 116 carried by the switch $S^4$; and this latter is also provided with a terminal 117 with which it makes contact so as to connect said terminal with the terminal 114 when it is in raised position; the terminal 117 being connected in turn by a lead 118 to the negative pole of the clutch-element $A^1$. In the positive current-lead $62^a$ is interposed an electromagnet $E^4$ which acts upon an armature 119 carried by an arm 120 pivoted on an axis 121 near the pivot-terminal 114 of the switch $S^4$, and on the same pivot 121 is mounted a lifting-finger 122, which may be either integral with the arm 120 or, as shown, may be set at an adjustable angle therewith by means of a set-screw 123. The lifting-finger 122 is, as shown, in position to strike the switch $S^4$ and raise it when it is itself raised by the attraction of the armature 119 by the electromagnet $E^4$. The terminals of the magnet $E^3$ are connected across the circuit by leads 124 and 125, the former to the positive pole of the battery through the lead $62^a$, and the latter to the lead 115 and thence to the controller G and negative pole of the battery. In addition to this safety-device I provide signaling apparatus, which is shown on the left of Fig. 2, the same comprising an electromagnet $E^5$ inserted into the lead 65'; a pivoted switch $S^5$, which carries the armature 126 of the magnet E⁵ and is arranged to make contact with a terminal 127 when the armature is attracted by the magnet, the switch S⁵ itself being connected by a lead 128 to the negative pole of the battery; and a signaling-device such as a bell L, one of whose terminals is connected by a lead 129 to the terminal 127 and the other by a lead 130 to the positive pole of the end cell of the battery as shown.

The cycle of operations is as follows: Starting with the contact-arm in the position shown, the apparatus is entirely disconnected, neither of the blocks 111, 112 making contact with any of the contact-strips of the controller. On moving the arm 109 to the left, the electromagnetic-element E¹ is first thrown into circuit through the leads 62ª, 62ᵇ, 91, 92, 93, 94, 94ª, strip g³, contact-arm 109, terminal 108 and leads 95 and 65', and the core 80 will be attracted, the switch S³ opened and switch S¹ closed, thus closing the field and armature circuit of the motor in the manner previously described, and setting it in motion; the electromagnetic-element E² subsequently acting automatically to close the switch S² and shortcircuit the resistance Rb as soon as the motor obtains speed, as previously described. On the next movement of the controller-arm 109 the block 111 makes contact with the strip g⁴, thus throwing into circuit the low speed clutch-element A¹ and causing the driven-shaft to turn, and this speed is increased by further movements of the arm 109 over the strips g⁵, g⁶ and g⁷, which throw in successive sections of the resistance R and thus increase the motor-speed. Upon further movement the controller-arm 109 leaves the strips g⁴ and g⁷ and makes contact with the strips g⁸ and g⁹, thus disconnecting the clutch-element A¹ and at the same time throwing out the resistance R from the field, and further energizing the clutch-element A² through the lead 115, the switch S⁴, terminal 113 and leads 106', 104 and 62ª. By further turning the contact-arm over the strips g¹⁰, g¹¹ and g¹², the successive sections of the resistance R are again cut out to speed up the motor correspondingly. Now in case the load upon the driven-shaft is too heavy, so as to cause an excessive rush of current through the battery, the electromagnet E⁵ will attract its armature 126 and close the circuit of the bell L, causing it to ring and thus notifying the operator of the overdischarge in order that he may throw back the contact-arm to a lower speed; but should he disregard this notice altogether, as would often happen in the case of reckless or ignorant persons, the electromagnet E⁴ will operate to attract its armature 119 upon the arm 120 and raise the finger 122, which in turn raises the switch S⁴ and cuts the high speed clutch-element A² out of circuit, at the same time throwing the low speed clutch-element A¹ into said circuit through the contact-strip g⁹, lead 115, switch S⁴, terminal 117 and leads 118, 105, 103 and 62ª. So long as the contact-arm is upon the strip g⁹ current will be flowing through the electromagnet E³; but this magnet is of insufficient strength to raise the switch S⁴ from its lower position, yet strong enough to hold it when raised by the lifting-finger 122, therefore, when the switch is raised by the action of the magnet E⁴, as aforestated, it will be held in raised position and current will continue to flow through the low speed clutch-element A¹ until the operator has returned the controller-handle to the position 109', in which it has broken contact with the strip g⁹, thereby throwing the magnet E³ out of circuit and permitting the switch S⁴ to drop again. Hence it will be seen that when once an overdischarge flows from the battery due to the premature connection of the high-speed clutch-element, the said element will be immediately thrown out of circuit and cannot again be thrown in by the operator until he has returned the contact-arm to the low-speed clutch connection. The current-load at which the electromagnet E⁴ will operate can be adjusted by the set-screw 123 to set the armature 119 to the corresponding distance from the magnet.

The same observations with respect to a definite speed corresponding to a definite position of the contact-arm and the absorption of the current by the motor in slackening speed applies to this as to the previous form, only it is important to be said that this is of particular importance in an automobile. Moreover, in descending hills, contact-arm being set for a slow speed, the speed of descent will be fixed without the agency of any mechanical brake, and the power consumed in checking it will be absorbed by the motor and returned to the battery, thus recharging the latter to some extent and increasing its length of use. When the controller-arm reaches the position shown in full lines in the drawing, the motor-armature is short-circuited so as to brake the motion powerfully; and when it is thrown still further to the extreme right, by means of the contact-strips g¹ and g² both clutch-elements are simultaneously energized so as to quickly stop the vehicle if in motion, and hold it stationary, dispensing entirely with mechanical brakes.

It will of course be understood that it is not necessary to employ both the signaling-device and the safety-device upon the same apparatus, as in many cases one or the other will serve all requirements. Where both are used, the magnet E⁵ should be set to operate slightly before the magnet E⁴ so as to give notice to the operator in time to prevent an overdischarge, which alone would operate the magnet E⁴. And further, it will be understood that the forms of the various automatic switches and electromagnetic elements as shown in the drawing are merely diagrammatical and symbolical and do not represent the forms actually used except in their mode of operation, and that skilled electricians are able to devise a great variety of practical forms which will fulfil the same function.

My invention is not limited to the use of any of the specific forms shown, nor all the devices illustrated, as some might obviously be omitted.

Figure 5:
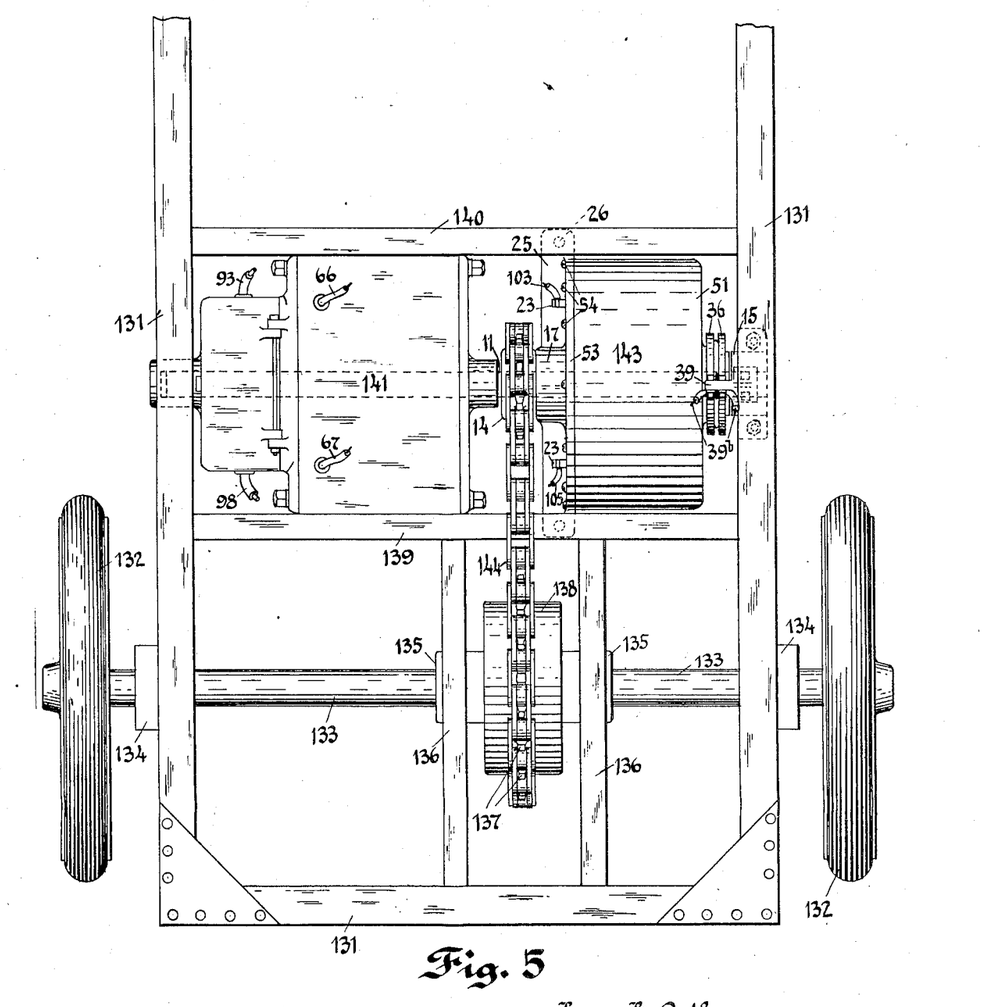
Fig. 5 is a plan view of part of an automobile-truck showing the method of mounting the driving-mechanism thereon.

Fig. 5 illustrates one manner in which I contemplate mounting the transmission mechanism upon an automobile-frame. I have shown one end of a rectangular frame 131 supported by driving-wheels 132 having axles 133 which turn in bearings 134 in the sides of the frame and in intermediate bearings 135 carried by secondary frame-bars 136. The ends of the axles 133 are connected with a sprocket-gear 137 by a differential gearing 138. The frame 131 has also transverse bars 139, 140 between which are mounted a motor 141 driving a shaft 11, on the other end of which is mounted a clutch-mechanism 143 which is arranged as shown in Fig. 4. At the left of the clutch-mechanism is set the sprocket-pinion 14, over which passes the driving-chain 144 connecting it with the gear 137. The operation will be readily understood from the preceding description.

In the foregoing description I have, while illustrating only a system driven by an electrical motor, referred to the fact that any other prime-mover, as for instance a thermic or mechanical motor might be used. It will of course be understood that in this case the prime-mover will be electrically controlled so as to start and stop the same and run it at different speeds as desired, and the scheme of connections and control would be correspondingly changed and inappropriate features of the electrical motor-system omitted. Also it is to be understood that, while I have illustrated a special form of double-speed clutch, which forms an important element of my invention, this form is not in any way essential to the carrying out of the general principles thereof, as any other means might be employed for changing the transmission ratio between the motor and driven shaft from one value to another, without departing from the principle involved.

Having thus described my invention, what I claim as new and desire to secure by Letters Patent is:—

1. In combination, a prime-mover having substantially constant speed under varying load, a driven-shaft, a transmission-mechanism connecting said mover and said shaft, said transmission-mechanism being capable of several speed-ratios, and means operated by an excess of load upon said prime-mover for shifting said mechanism from a high to a low speed-ratio.

2. In combination, a prime-mover, a driven-element, a variable-speed transmission-mechanism connecting them, and electrically operated means for shifting said mechanism from a high to a low speed when an excess of load falls on said prime-mover.

3. In combination, a prime-mover, a driven-element, and a transmission-mechanism comprising high and low speed electromagnetic clutch-elements, and means for connecting operatively either of said electromagnetic-elements separately whereby the driven-element is driven at either of the two speeds and for connecting them simultaneously whereby said driven-element is stopped altogether.

4. In combination, a prime-mover, a driven-element, a variable-speed transmission-mechanism, electric controlling means for said mover, electric means controlling the speed-ratio of said transmission-mechanism, and an electric circuit-controller connected with both of said controlling means and connected up so as to successively start said prime-mover and vary the speed-ratio of said transmission-mechanism from low to high speed when moved in one direction and conversely to vary the speed from high to low and then stop said mover when moved in the other direction.

5. In combination, a prime-mover, a driven-element, a variable-speed transmission-mechanism, a controller operatively connected with said mover and mechanism to operate said mover and vary the speed-ratio of said mechanism in the different positions of said controller, and connections also operated by said controller for connecting said transmission-mechanism at two different speeds simultaneously whereby the whole apparatus is brought to a stop.

6. In combination, a prime-mover, a driven-element, a variable-speed transmission-mechanism connecting them, electrical devices controlling the speed of said prime-mover, electrical devices controlling the speed-ratio of said transmission-mechanism, and an electrical circuit-controller connected with said electrical devices and arranged in its several positions to start, stop and vary the speed of said prime-mover and to connect, disconnect and vary the speed-ratio of said transmission-mechanism.

7. In combination, a prime-mover adapted to run at variable speeds, electrical devices for starting and stopping it and varying the speed thereof, a driven-element, a disconnectible transmission-mechanism connecting said mover with said element and having a variable speed-ratio, electrical devices controlling the operative connection and the speed-ratio of said mechanism, and a controller connected with said electrical devices and arranged to start said mover, then to connect said mechanism, then to vary the speed of said mover and the speed-ratio of said mechanism alternately as set forth, said controller having connections for connecting said mechanism simultaneously at two speed-ratios whereby the entire apparatus is brought to a stop.

8. In combination, a prime-mover adapted to run at variable speeds, electrical devices for starting and stopping it and varying the speed thereof, a driven-element, a disconnectible transmission-mechanism connecting said mover with said element and having a variable speed-ratio, electrical devices controlling the operative connection and the speed-ratio of said mechanism, a controller connected with said electrical devices and arranged to start said mover, then to connect said mechanism, then to vary the speed of said mover and the speed-ratio of said mechanism alternately as set forth, and a device actuated by excess of load upon said mover for automatically varying the speed-ratio of said transmission-mechanism.

9. In combination, a prime-mover adapted to run at variable speeds, electrical devices for starting and stopping it and varying the speed thereof, a driven-element, a disconnectible transmission-mechanism connecting said mover with said element and having a variable speed-ratio, electrical devices controlling the operative connection and the speed-ratio of said mechanism, a controller connected with said electrical devices and arranged to start said mover, then to connect said mechanism, then to vary the speed of said mover and the speed-ratio of said mechanism alternately as set forth; and a device operatively connected with said controller when the latter is set for a high speed-ratio of said transmission-mechanism for automatically throwing said mechanism back to a low speed-ratio in case of excess of load upon said mover.

10. In combination, a prime-mover having substantially constant speed under varying load, a driven-element, a variable-speed transmission-mechanism connecting them, a controlling-mechanism for varying the speed-ratio of said transmission-mechanism, and a device operating when said mechanism is set for a high speed-ratio by excess of load upon said prime-mover to automatically throw said mechanism back to a lower speed-ratio, thereby increasing the force acting upon said driven-element and relieving the excess of load upon said mover.

11. In combination, a prime-mover, a driven-element, an electrically controlled variable-speed transmission-mechanism connecting them, an electrical circuit-controller adapted to vary the connections of said transmission-mechanism to change the speed-ratio thereof, and an electrical device actuated by excess of load upon said prime-mover to change the speed-ratio of said transmission-mechanism from a higher to a lower value.

12. In combination, a prime-mover adapted to operate at a plurality of speeds, a driven-element, a variable-speed transmission-mechanism connecting them, electrical devices for starting, stopping and varying the speed of said mover, electrical devices for connecting, disconnecting and varying the speed-ratio of said transmission-mechanism, a controller operating said electrical devices to successively start said motor, connect said transmission-mechanism at a low speed-ratio, and then alternately vary the speed of said mover and the speed ratio of said mechanism, and an electromagnetic-device operatively connected in circuit by said controller when said mechanism is set for a high speed-ratio, said device being operated by an excess of load upon said mover to shift the circuit-connections of said electrical devices controlling said mechanism whereby the speed-ratio is changed to a lower value.

13. In combination, an electric motor, an element driven thereby, a pair of electromagnetic clutch-elements adapted to connect said motor alternatively with said driven-element and operating at different speed-ratios, and a controller connected with said motor to start and stop the same and operate it at different speeds and also connected with said clutch-elements and so arranged as in its successive positions first to start said motor, then to energize the low-speed clutch-element, then to increase the speed of said motor, then to simultaneously disconnect the low-speed clutch-element and connect the high-speed clutch-element and return said motor to its original speed and then to increase the speed of said motor; said controller having connections whereby said motor is simultaneously disconnected and both said clutch-elements simultaneously energized, thereby bringing the entire apparatus to a standstill.

14. In combination, a driving-element, a driven-element, a pair of electrically operated clutch-elements connecting alternatively said driving- and said driven-elements and operating at different speed-ratios, a controller adapted to actuate either of said clutch-elements alternatively, and a device operated by excess of load on said driving-element for shifting the connection from the high-speed to the low-speed clutch-element.

15. In combination, an electric motor, an element driven thereby, a pair of electromagnetic clutch-elements adapted alternatively to connect said motor with said driven-element and operating at different speed-ratios, a controller connected with said motor and with said clutch-elements to operate the motor and energize alternatively said clutch-elements, and an electromagnetic-device operated by excess of current in said motor to shift the connection from the high-speed clutch-element to the low-speed clutch-element.

16. In combination, a driving-element, a driven-element, a pair of electromagnetic clutch-elements adapted to alternatively connect said elements and operating at different speed-ratios, a controller adapted first to energize the low-speed clutch-element and then to deënergize it and energize the high-speed clutch-element, a switch adapted to shift the current from said high-speed to said low-speed clutch-element but normally maintaining closed the circuit of said high speed-element, means actuated by excess of load for shifting said switch to the low speed-element, and an electromagnetic-device acting to maintain said switch when so shifted until said controller is returned to the low-speed position, in which position the circuit of said electromagnetic device is opened, permitting said switch to resume its normal position.

17. In combination, an electric motor, an element driven thereby, a pair of electrically operated clutch-elements connecting said motor with said driven-element, a controller adapted to first energize the low-speed clutch-element and subsequently deënergize it and energize the high-speed clutch-element, a switch in the circuit from said controller to said high-speed clutch-element adapted to shift the current in said circuit to the said low-speed clutch-element and normally maintaining the high-speed clutch-element circuit closed, an electromagnetic-device actuated by excess of current in the motor-circuit to shift said switch to the low-speed clutch-element circuit, and a second electromagnetic-device connected from said switch to the opposite side of the circuit, said second device being of insufficient strength to shift said switch but sufficient to hold it when shifted, whereby the connection is automatically shifted from the high-speed to the low-speed clutch-element circuit in case of excessive current, and thereafter automatically maintained at that position until said controller is returned to the low-speed position.

18. In combination, an electric power circuit, a motor adapted to be connected therein, an element driven by said motor, an electrically operated variable-speed transmission-mechanism connecting said motor with said driven-element, a controller connected with said motor to start and regulate the same and with said transmission-mechanism to vary the speed-ratio of the same, an electromagnetic signaling device in said motor-circuit adapted to give notice of maximum permissible strength of current or approach thereto, and an electrically operated device also connected in said circuit and actuated by excess of current for automatically lowering the speed-ratio of said transmission-mechanism.

19. In combination, a prime-mover having substantially constant speed under varying load, a driven-element, a variable-speed transmission-mechanism connecting them, and automatic means for shifting said mechanism from the high-speed to a low-speed ratio when an excess of load falls on said prime-mover.

20. In combination, an electric motor, a driven-element, a variable-speed transmission-device connecting said motor and element, magnetic-clutches controlling the speed-ratio of said device, a starting-resistance for said motor, a magnetic switch closing the main motor-circuit and one or more additional magnetic-switches arranged to automatically cut out the starting-resistance of the motor as the speed of the same increases.

21. In combination, an electric motor, a driven-element, a variable-speed transmission-device connecting said motor and element, electromagnetic clutches controlling the speed-transmission-ratio of said device, an electromagnetic-switch controlling the main motor-circuit and one or more electromagnetic switches acting automatically and successively in proportion to the increase of the counterelectromotive force of the motor, to accelerate the speed of said motor.

22. In combination, an electric motor, a variable-speed transmission-device comprising magnetic clutches, and an electromagnetic switch actuated by excess of load upon said motor to control the winding of one of said clutches.

23. In combination with an electric motor, a variable-speed transmission-mechanism comprising a gear-train and magnetic clutches controlling the speed-ratio thereof, a signaling-device such as a bell, and an electromagnetic-switch operated by an overload upon said motor to operate said signaling-device.

24. In combination, a prime mover, a driven-shaft, a transmission-mechanism connecting said mover and said shaft, said transmission mechanism being capable of several speed-ratios, and means for shifting said mechanism from a high to a low speed-ratio, said means being thrown into operation by an excessive flow of energy to said prime mover.

In witness whereof I have hereunto set my hand this first day of January 1906.

HENRY H. CUTLER.

In presence of—
   A. H. BARNICKEL,
   NELSON S. HOPKINS.